2,950,310

SURFACE ACTIVE SUBSTANCES

Willard H. Kirkpatrick, Sugar Land, Tex., assignor to Visco Products Company, Houston, Tex., a corporation of Delaware No Drawing. Filed Aug. 8, 1957, Ser. No. 676,917

21 Claims. (Cl. 260—475)

This invention relates to new and improved surface active substances and more particularly surface active substances which are effective in breaking water-in-oil petroleum emulsions.

Petroleum emulsions are in general of the water-in-oil type wherein the oil acts as a continuous phase for the dispersal of finely divided particles of naturally occurring waters or brines. These emulsions are often extremely stable and will not resolve on long standing. It is to be understood that water-in-oil emulsions may occur artificially resulting from any one or more of numerous operations encountered in various industries. The emulsions obtained from producing wells and from the bottom of crude oil storage tanks are commonly referred to as "cut oil," "emulsified oil," "bottom settlings," and "B.S."

One type of process involves subjecting an emulsion of the water-in-oil type to the action of a demulsifying agent of the kind hereinafter described, thereby causing the emulsion to resolve and stratify into its component parts of oil and water or brine after the emulsion has been allowed to stand in a relatively quiescent state.

Another type of process involves the use of a demulsifying agent of the kind hereinafter described in refinery desalting operations. In the refining of many crude oils a desalting operation is necessary in order to prevent the accumulation of large deposits of salt in the stills and to prevent corrosion resulting from the decomposition of such salts under high still temperatures. In a typical desalting installation 5% to 10% of fresh water is added to the crude oil charge stock and emulsified therein by means of a pump or through a differential pressure valve. A demulsifying agent is added and the treated oil permitted to stand in a quiescent state for relatively short periods of time allowing the salt-laden water to stratify, whereupon it is bled off to waste resulting in 90% to 98% removal of salt content. This operation is carried out continuously as contrasted with batch treating.

An object of the present invention is to provide a novel reagent which is water-wettable, interfacial and surface-active in order to enable its use as a demulsifier or for such uses where surface active characteristics are necessary or desirable. Other objects will appear hereinafter.

The novel substances provided in accordance with the present invention consist of compositions of high molecular weight which are monomeric acidic esters of an organic polycarboxy acid and a polyoxyalkylene compound having a terminal hydroxy group in which the major proportion of the molecular weight of said polyoxyalkylene compound consists of oxyethylene and oxypropylene (e.g., oxy-1,2-propylene) groups in which the weight ratio of oxyethylene to oxypropylene does not exceed 4:1 and the minimum molecular weight attributable to both oxyethylene and oxypropylene groups is at least 1000. With the foregoing limitations the molecular weights of the substances provided in accordance with the invention are preferably within the range of 1500 to 7500.

It has been discovered that these compositions have unusual and unexpected to properties for resolving water-in-oil emulsions into their component parts. One possible theory which may be postulated for the striking effectiveness of these compositions in resolving petroleum emulsions is a hydrophobe-hydrophile balance which has not been secured heretofore with compositions well known in this art.

The preparation of polyoxyalkylene diols which may be employed as starting materials for the preparation of the corresponding esters has been described in U.S. Patent 2,425,845. This patent describes the preparation of polyoxyalkylene diols prepared from the reaction of ethylene oxide, 1,2-propylene oxide and an aliphatic dihydroxy alcohol. The resulting heteric diols possess viscosity relationships, solubility relationships and fusion temperature relationships entirely unlike those expected, based on comparisons with polyoxyethylene glycols on the one hand, and polyoxypropylene glycols on the other. For example, polyoxyethylene glycols of an average molecular weight of about 600 to 800 have the consistency of a semi-fluid, pasty mass. Below this range, the products are clear, normally liquid compositions which are miscible with water in all proportions. At and above the average molecular weight of 800 to 900 the polyoxyethylene glycols are low melting, normally solid compositions having a fusion temperature which increases with increased molecular weights from about 30° C. to a maximum of approximately 60° C. to 65° C. These solid products are miscible with water in all proportions.

The compositions of this invention wherein oxyethylene and oxypropylene groupings are present in a random or alternate sequence possess characteristics which cannot be secured by a simple blending of polyoxyethylene compounds with polyoxypropylene compounds. It is possible within such a given molecule to secure a molecular weight from 3,000 to 20,000 where the product remains liquid at normally prevailing temperatures. Such products are miscible in water and in oils. However, the water solubility decreases as the temperature is raised and at higher temperatures two-phase systems result. These characteristics are unusual and striking and would not be anticipated by careful consideration of the characteristics of polyoxyethylene glycols and polyoxypropylene glycols.

The preferred compositions contemplated for use in accordance with this invention are exemplified by the following structural formula:

(1) 
$$R'(OC_nH_{2n})_xR$$

wherein R' is an acyl radical of an organic polycarboxy acid and R is either hydroxy or an oxyacyl radical, with the further understanding that where R is an oxyacyl radical the terminal ester groups may be the same or different; $n$ is both 2 and 3 in a single molecule and $x$ is equal to the sum of the number of times $n$ has a value of 2 plus the number of times that $n$ has a value of 3 and the maximum ratio of $n$ having a value or 2 to $n$ having a value of 3 is such that the maximum weight ratio of oxyethylene to oxypropylene does not exceed 4:1, it being further understood that the molecular weight of said composition attributable to both the oxyethylene and the oxypropylene groups is in excess of 1,000.

Other illustrative compositions provided in accordance with the invention have the same general formula, where R', $n$, and $x$ have the same significance and R is oxyalkyl, oxyaralkyl, oxycycloalkyl, oxyaryl, secondary or tertiary aminoalkyl, secondary or tertiary aminoaralkyl or secondary or tertiary aminoaryl.

All of the compounds provided in accordance with the invention are characterized by the nucleus —(OC$_n$H$_{2n}$)$_x$— wherein $n$ has a value of both 2 and 3 in a ratio such that the weight ratio of oxyethylene to oxypropylene does not exceed 4:1, and a major proportion, preferably at least 60% by weight of the ester, is attributable to this nucleus.

The expression "acidic esters" as employed herein means that the esters contain a free carboxyl group and therefore are acidic in nature. It is possible, for example, to prepare such esters by reacting together one mol of a polyoxyalkylene glycol and one mol of an organic dicarboxy acid under such conditions that complete esterification of the hydroxyl groups of the glycol is not obtained. In other words, the reaction is not driven to completion. The esters of the invention can also be prepared by reacting together one mol of a polyoxyalkylene glycol having the herein described chemical structure and two mols of an organic dicarboxy acid. In any case, however, the resultant product to be an acidic ester must contain free carboxy groups.

The polyoxyalkylene compound employed in preparing the monomeric esters of the invention can also be a monoether of a polyoxyalkylene glycol having the herein described chemical structure as disclosed, for example, in U.S. 2,425,755. The terminal hydrocarbon group of the monoether group can be alkyl, alkenyl, aralkyl, aralkenyl, cycloalkyl or aryl. Thus, one mol of any of the monoethers in the aforesaid patent having the required chemical structure as set forth herein can be esterified with one mol of an organic dicarboxy acid. The resultant product is a monoester of a polyoxyalkylene diol monoether.

It will be apparent that the products of the invention can be monoesters of polyoxyalkylene diols derived by the reaction of one mol of the diol with one mol of an organic dicarboxy acid or acid anhydride without driving the reaction to completion so that the resultant product contains say one ester group, a terminal hydroxyl group and a terminal carboxyl group. The products of the invention can also be monomeric diesters of polyoxyalkylene diols obtained by esterifying one mol of the diol with two mols of an organic dicarboxy acid or acid anhydride so that the resultant product contains, for example, two ester groups and terminal carboxyl groups and only one glycol unit. If the initial polyoxyalkylene compounds containing a free hydroxyl group has an ether group on the opposite end of the chain, one ester group can be formed from one mol of a dibasic acid anhydride and one mol of the polyoxyalkylene compound and the resultant ester will have a terminal ether group and a terminal carboxyl group. The compositions of the invention can also consist of mixtures of esters, as, for example, mixtures of monomeric monoesters and monomeric diesters. The substitution of hydrogen by halogen, nitro, hydroxyl, sulfonic and similar groups in either of the ether or acyl radical does not depart from the scope of this invention for simple substitution products of this nature have been found to be equally satisfactory for the purpose as outlined herein.

It is not intended that the foregoing lists each and every polyoxyalkylene ester composition that will satisfactorily resolve water-in-oil emulsions in accordance with this invention, for it will be obvious to those skilled in the art that certain mixed derivatives would function satisfactorily and in fact are contemplated by the present invention.

The esters of the invention may also be described as being surface active and water wettable. Since they have a residual free carboxy group they are ionizable to yield organic anions.

The esters of the polyoxyalkylene compounds are prepared in accordance with recognized and established procedures for such synthesis. The simplest manner of preparing the esters is by reacting the polyoxyalkylene compound containing a hydroxyl group with the desired acid anhydride of a polycarboxy acid without elimination of water. For the purpose of this invention the presence of a small quantity of residual free acid is not harmful if the resultant ester is to be used as a demulsifier. In those instances where acid anhydrides are not readily available the polyoxyalkylene compound containing a hydroxyl group may be reacted with the required acid in the presence of a solvent which lends itself to azeotropic distillation. The reaction mass is then heated at elevated temperatures until the theoretical amount of water has been secured to indicate monomeric esterification. Both symmetrical and unsymmetrical esters can be prepared by this procedure and the resulting compositions are effective in demulsifying water-in-oil emulsions. Further, it has been noted that both monomeric mono- and monomeric diesters of polybasic acids, where one or more of the carboxyl groups remain unreacted, are particularly effective as demulsifiers.

Since as indicated above it is possible to prepare the compositions of this invention by various routes and from a number of different classes of starting materials the invention should not be limited by the following examples which are merely intended to illustrate some satisfactory procedures for preparing a few of the materials suitable for employment within the scope of the present invention. In these examples, no aqueous distillate is eliminated unless so indicated.

EXAMPLE I

In a suitable reaction flask there is placed 500 parts of a monobutyl ether of a heteric polyoxyalkylene diol having a molecular weight of 5000, as prepared in accordance with the procedure described in U.S. Patent 2,425,755, 15 parts of maleic anhydride and 100 parts of SO$_2$ extract. At approximately 50° C. the maleic anhydride dissolves and forms the monoester by adding to the terminal hydroxyl group by opening of the anhydride linkage. To insure complete reaction the reaction mixture is heated for 4 hours at 200° C. This yields the monoether-monoester composition having a free residual carboxyl group.

EXAMPLE II

In a suitable reaction flask there is placed 850 parts of a butyl ether of a heteric polyoxyalkylene diol having a molecular weight of approximately 1700 as prepared similarly to the directions of Example I, 68 parts of diglycolic acid and 100 parts of SO$_2$ extract. The reaction mixture is heated and an aqueous distillate begins to form at 208° C. After 5 hours heating and a maximum temperature of 257° C. a total of 9 parts of aqueous distillate is secured to yield a monomeric acidic diglycolic ester of the monobutyl heteric diol ether.

EXAMPLE III

To 220 parts of a hetero polyoxyalkylene diol having a molecular weight of 2200 (wherein the oxypropylene groups constitute 25% by weight and the oxyethylene groups 75% by weight of the oxyalkylene groups present) contained in a suitable reaction flask there is added 30 parts of phthalic anhydride and 100 parts of a hydrocarbon diluent such as SO$_2$ extract. The reaction mixture is heated to 155° C. and held at that temperature for a period of 5 hours. Esterification is accomplished by the opening of the anhydride linkage to completely esterify both hydroxy groups of the starting diol. After cooling to approximately 100° C., 400 parts of a hydrocarbon diluent such as SO$_2$ extract is added to yield the finished product.

EXAMPLE IV 4650 pounds (2.75 mols) of the monobutyl ether of a polyoxyalkylene glycol having a molecular weight of about 1700 and derived from approximately equal weight proportions of ethylene oxide and 1,2-propylene oxide are charged into a strainless steel processing vessel and reacted with 800 pounds (5.4 mols) of phthalic anhydride. The reaction mixture is heated to 155° C. and maintained at that temperature for 5 hours. 9360 pounds of $SO_2$ extract are then added to yield the final product. This product is an excellent demulsifier for breaking water-in-oil emulsions.

EXAMPLE V

A polyoxyalkylene glycol is prepared by reacting 35 mols of 1,2-propylene oxide to give a product having a molecular weight of approximately 2000. 4 mols of ethylene oxide are then added to this product to produce a product having a central portion consisting of oxy-1,2-propylene groups and terminal portions consisting of oxyethylene groups, the amount of ethylene oxide in this product being approximately 8% by weight. 6750 pounds of the aforesaid product are reacted with 800 pounds of maleic anhydride by heating the reactants in a processing kettle at 140° C. to 150° C. with agitation for a period of 6 hours. 5440 pounds of $SO_2$ extract are mixed with the reaction mass to yield the finished product.

EXAMPLE VI

The procedure is the same as in Example V except that 4500 pounds of oxyethylated polyoxypropylene glycol having a molecular weight of 2000 are mixed with 545 pounds of maleic anhydride and heated together in a processing kettle to 140° C. to 150° C. with agitation for a period of 6 hours. The resultant ester composition is then mixed with 1040 gallons of $SO_2$ extract and 110 gallons of 99% isopropanol to yield the finished product.

EXAMPLE VII

The procedure is the same as that in Examples V and VI except that chemically equivalent amounts of oxyethylated polyoxypropylene glycol containing 35 mols of 1,2-propylene oxide and 8 mols of ethylene oxide are substituted for the oxyethylated polyoxypropylene glycol containing 35 mols of 1,2-propylene oxide and 4 mols of ethylene oxide. In this case the starting glycol contains about 15% by weight of ethylene oxide and there are approximately 4 mols of ethylene oxide connected to the terminal portions of the polyoxypropylene chain on each end thereof.

EXAMPLE VIII

The procedure is the same as in Examples V and VI except that chemically equivalent proportions of an oxyethylated polyoxypropylene glycol derived by the addition of 12 mols of ethylene oxide to a polyoxypropylene glycol having a molecular weight of about 2000 are employed. In this case the ethylene oxide content of the oxyethylated polyoxypropylene glycol employed as a starting material is approximately 21% by weight.

EXAMPLE IX

Glycerine is reacted with 1,2-propylene oxide in a ratio of 51 pounds of 1,2-propylene oxide per pound of glycerine. To each pound of the resultant material is added 0.6 pound of ethylene oxide to give a final product which is an oxyethylated-oxypropylated glycerine having a molecular weight of about 4000 to about 4500. This product is soluble in water in all proportions and is also oil soluble in all proportions. The aforesaid product is then reacted with maleic anhydride, phthalic anhydride, or diglycolic acid in molar ratios within the range of 1 mol of the oxyethylated-oxypropylated glycerine to 1 to 2 mols of the dicarboxy acid or anhydride under conditions such that the final product is monomeric and contains free carboxyl groups.

By way of illustrating the remarkable effectiveness of the products contemplated by this invention, the method of testing their efficiency in bottle tests will be described and exemplary data given, and this will be followed by the results of a full scale plant test.

Field bottle test I

Field bottle tests were made on samples of emulsified oil taken from the Cayuga Field in East Texas. A sample grindout showed that these emulsions contained about 70 parts of water per 100 parts of emulsion. The oil being treated in this field had a gravity of about 28° A.P.I. A gun barrel system was being used in the field and the oil was being treated at an approximate temperature of 160° C.

One hundred (100) cc. samples were taken and placed in conventional field test bottles. A test with another chemical which was being used to treat the oil commercially indicated that about 0.06 cc. of a 10% solution of the treating chemical was required per 100 cc. of sample. In testing the composition of the present invention the treatment employed was at the rate of 1 gallon of the treating chemical to 250 barrels of net oil, that is, oil after the removal of the water.

After the test chemical was added, the samples which were placed in the test bottles were shaken 200 times at atmospheric temperatures and subsequently agitated an additional 100 times at a temperature of 140° F. After shaking in each instance, the water drop was determined and recorded, that is to say, the amount of water which separated from the emulsion. The color and sheen or brilliance of the oil was also observed and recorded at the same time. After agitation at elevated temperatures, the samples were maintained at 160° C. to permit settling and stratification of the water.

The samples were secured just after the oil came from the well and every effort was made to maintain conditions comparable to those present in a full scale plant treatment. After agitating, the samples were allowed to settle and were tested for water drop at predetermined periods of time and were recorded on suitable tests sheets.

The test showed that an ester composition prepared in accordance with this invention caused 69 of the 70 parts of water to separate before the bottles were given hot agitation. After settling 30 minutes at 160° F., substantially all of the water had separated indicating that the emulsion had been resolved satisfactorily.

Plant scale test

This test was made by actually testing the oil from the production from a well in the Cayuga, Texas, field. The treating system comprised of the separator, gun barrel and a chemical proportioning pump to add the chemical treating agent.

The treating agent employed was a monoester-monoether of a heteric polyoxyalkylene diol similar to that prepared in Example I above. The treatment was started at 2:30 and was observed for 72 hours. During the first 24 hours the rate of chemical injection was adjusted so that the chemical consumption was about 2 gallons per day, which compared favorably with another treating agent which had previously been used in this plant system. During the 3 day test the oil was treated satisfactorily with the oil going to stock at from 0.4 to 1.0 percent B.S. & W. which is substantially below the pipeline specifications for the given field. The treating ratio was 1 gallon chemical per 160 barrels of oil. The treatment was continued and found to be entirely satisfactory.

In the previous description, frequent reference has been made to heteric polyoxyalkylene diols and by the word "heteric" is meant that the diol constituents of the mixture vary in internal configuration from molecule to molecule, such variations arising out of a randomness of the distribution of the oxyethylene and the oxypropylene groups therein, as results, for example, from the concurrent reaction of the ethylene oxide and the proylene oxide on the starting material and the intermediate products.

Where the 1,2-propylene oxide is first reacted to form a long chain polyoxypropylene polyol which is subsequently reacted with ethylene oxide, the resultant compositions are referred to herein as polyoxyethylene-polyoxypropylene polyols.

It will be apparent from the foregoing description that the polyoxyalkylene compounds containing a free hydroxyl group which are employed as starting materials preferably contain a minimum of about 8% by weight of ethylene oxide and a maximum of 75% by weight of ethylene oxide. In most instances, the proportion of ethylene oxide will not exceed 50% by weight of said polyoxyalkylene compound.

Throughout the specification and claims the following definitions apply:

*Alkyl.*—A monovalent radical derived from an aliphatic hydrocarbon by removal of one hydrogen atom, as, for example, methyl, ethyl, propyl, octyl, cetyl, myricyl and their homologues, preferably containing 1 to 30 carbon atoms;

*Alkenyl.*—A monovalent radical derived from an unsaturated aliphatic hydrocarbon, as, for example, ethenyl (vinyl), allyl, undecenyl, octadecenyl, linolenyl, and their homologues, preferably containing 2 to 18 carbon atoms and having a single double bond;

*Aralkyl.*—A monovalent radical derived from an aromatic substituted aliphatic hydrocarbon, as, for example, benzyl, phenylethyl, phenylpropyl, phenylbutyl, phenyloctyl, phenylcetyl, phenyloctadecyl and homologues, preferably containing 1 to 30 carbon atoms in the alkyl chain;

*Cycloalkyl.*—A monovalent radical derived from a cycloaliphatic hydrocarbon, as, for example, cyclopentyl, cyclohexyl and cycloheptyl;

*Aralkenyl.*—A monovalent radical derived from an aromatic substituted unsaturated aliphatic hydrocarbon, as, for example, styryl, cinnamyl, and homologues;

*Aryl.*—A monovalent radical derived from an aromatic hydrocarbon by removal of one hydrogen atom, as, for example, phenyl and naphthyl;

*Acyl.*—A radical derived from an organic polycarboxy acid by the removal of a hydroxy group as, for example, phthaloyl, maleyl, malonyl, adipoyl and succinoyl;

*Oxyalkyl.*—A monovalent radical derived from an aliphatic alcohol by removal of the hydrogen atom of an alcoholic hydroxyl, as, for example, methoxy, ethoxy, propyloxy, octyloxy, cetyloxy, myricyloxy, and homologues thereof, preferably containing 1 to 30 carbon atoms;

*Oxyaralkyl.*—A monovalent radical derived from an aralkyl alcohol by removal of the hydrogen atom of an alcoholic hydroxyl, as, for example, —O—CH$_2$C$_6$H$_5$, —O—C$_2$H$_4$C$_6$H$_5$, oxypropylphenyl, oxybutylphenyl, oxyoctylphenyl, oxycetylphenyl, oxyoctadecylphenyl, and homologues thereof, preferably containing 1 to 30 carbon atoms in the alkyl chain;

*Oxyaryl.*—A monovalent radical derived from a phenol by removal of the hydrogen of the phenolic hydroxy, as, for example, phenoxy, naphthoxy, and homologues thereof;

*Oxycycloalkyl.*—A monovalent radical derived from a cycloaliphatic alcohol by removal of the hydrogen of the alcoholic hydroxy, as, for example, cyclopentyloxy, cyclohexyloxy, cycloheptyloxy, and homologues;

*Oxyacyl.*—A monovalent radical having the structure

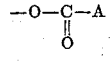

where

represents an acyl group, as, for example, the formic acid ester, acetic acid ester, ricinoleic acid ester, other fatty acid esters, diglycolic acid esters, phthalic acid esters, tallol esters, succinic acid esters, abietic acid ester, other resin acid esters, trimethylhexanoic acid ester, esters formed from alcoholysis products of castor oil, and homologues thereof;

*Secondary aminoalkyl.*—A monovalent radical derived by the removal of hydrogen from a nitrogen atom of a primary alkyl amine, as, for example, methylamino, ethylamino, butylamino, and higher homologues;

*Tertiary aminoalkyl.*—A monovalent radical derived by the removal of hydrogen from a nitrogen atom of a secondary alkyl amine, as, for example, dimethylamino, diethylamino, diisopropyl amino, dibutylamino and higher homologues;

*Fatty acid.*—Acetic acid and higher homologues together with the unsaturated acids such as oleic and ricinoleic derived from fats and fatty oils;

*Resin acid.*—Rosin and similar carbocyclic acids, preferably the oil soluble acids, e.g., rosin, cracked copals, etc.;

*Halogen.*—One of the atoms chlorine, bromine, iodine or fluorine;

*Halide.*—A salt containing a halogen atom as the anion.

The following specific compositions may be mentioned as illustrative of compositions provided in accordance with the invention:

I. The monomeric acidic esters obtained by reacting phthalic anhydride with heteric polyoxyalkylene glycols in which the oxyalkylene groups consist essentially of oxyethylene groups and 1,2-oxypropylene groups and the weight ratio of oxyethylene to oxypropylene does not exceed 4:1, the minimum amount of oxyethylene being approximately 8% by weight.

II. The monomeric acidic esters obtained by reacting maleic anhydride with heteric polyoxyalkylene glycols in which the oxyalkylene groups consist essentially of oxyethylene groups and 1,2-oxypropylene groups and the weight ratio of oxyethylene to oxypropylene does not exceed 4:1, the minimum amount of oxyethylene being approximately 8% by weight.

III. The monomeric acidic esters obtained by reacting diglycolic acid with heteric polyoxyalkylene glycols in which the oxyalkylene groups consist essentially of oxyethylene groups and 1,2-propylene groups and the weight ratio of oxyethylene to oxypropylene does not exceed 4:1, the minimum amount of oxyethylene being approximately 8% by weight.

IV. The monomeric acidic esters obtained by reacting phthalic anhydride with a polyoxyethylene-polyoxypropylene polyol containing 8% to 75% by weight of ethylene oxide.

V. The monomeric acidic esters obtained by reacting maleic anhydride with a polyoxyethylene-polyoxypropylene polyol containing 8% to 75% by weight of ethylene oxide.

VI. The monomeric acidic esters obtained by reacting diglycolic acid with a polyoxyethylene-polyoxypropylene polyol containing 8% to 75% by weight of ethylene oxide.

VII. The monomeric acidic esters obtained by reacting an alkyl ether of a polyoxyalkylene polyol of the type referred to in group I above with phthalic anhydride.

VIII. The monomeric acidic esters obtained by reacting an alkyl ether of a polyoxyalkylene polyol of the type referred to in group I with maleic anhydride.

IX. The monomeric acidic esters obtained by reacting an alkyl ether of a polyoxyalkylene polyol of the type referred to in group I with diglycolic acid.

X. The monomeric acidic esters of an alkyl ether of a polyoxyethylene-polyoxypropylene polyol of the type referred to in group IV above and phthalic anhydride.

XI. The monomeric acidic esters of an alkyl ether of a polyoxyethylene-polyoxypropylene polyol of the type referred to in group IV above and maleic anhydride.

XII. The monomeric acidic esters of an alkyl ether of a polyoxyethylene-polyoxypropylene polyol of the type referred to in group IV above and diglycolic acid.

In the compositions of the invention, one mol of a dicarboxy acid or acid anhydride such as maleic anhydride, diglycolic acid or phthalic anhydride reacted with one mol of a monoether of a polyoxyalkylene glycol containing both oxyethylene and oxypropylene groups will produce monoesters if one ester group is formed. In the event one mol of a polyoxyalkylene glycol containing both oxyethylene and oxypropylene groups is reacted with one mol of a dicarboxy acid or acid anhydride such as maleic anhydride, phthalic anhydride or diglycolic acid with the formation of one ester group, the resultant product is a monoester. If two mols of the dicarboxylic acid or acid anhydride are reacted with one mol of the polyoxyalkylene glycol, two ester groups can be formed. It will be apparent that cogeneric mixtures can be formed containing both monomeric mono- and monomeric diesters. The predominant components of these mixtures are monomeric in the sense that they have no repetition of the polyol unit. The expresssion "a monomeric acidic ester" is used throughout the specification and claims to cover single esters as well as mixtures of esters.

If in the general formula $R'(OC_nH_{2n})_xR$ $n$ is both 2 and 3, the product where two moles of maleic anhydride are reacted with one mole of a high molecular weight polyoxyalkylene glycol has the general formula (2) 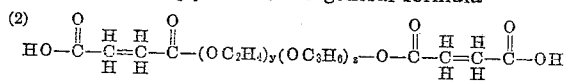

where $y$ and $z$ represent the number of oxyethylene and oxypropylene groups, respectively.

If diglycollic acid is used instead of the maleic anhydride, the product has the formula (3) 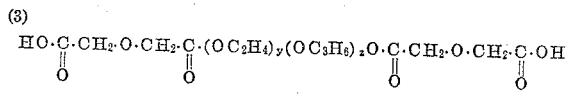

where $y$ and $z$ represent the number of oxyethylene and oxypropylene groups, respectively.

If in the general formula $R'(OC_nH_{2n})_xR$ $n$ is both 2 and 3, the product where one mole of maleic anhydride is reacted with one mole of a high molecular weight polyoxyalkylene glycol has the formula (4) 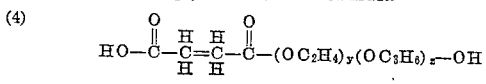

where $y$ and $z$ represent the number of oxyethylene and oxypropylene groups, respectively.

If diglycollic acid is used instead of the maleic anhydride, the product has the formula (5) 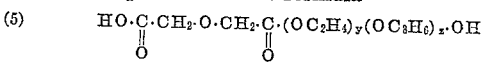

where $y$ and $z$ represent the number of oxyethylene and oxypropylene groups, respectively.

If in the general formula $R'(OC_nH_{2n})_xR$ $n$ is both 2 and 3, the product where one mole of maleic anhydride is reacted with one mole of a high molecular weight butyl ether of a polyoxyalkylene glycol has the general formula (6) 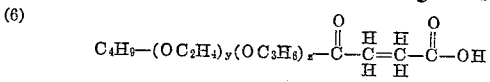

where $y$ and $z$ represent the number of oxyethylene and oxypropylene groups, respectively.

If diglycollic acid is used instead of the maleic anhydride, the product has the formula (7) 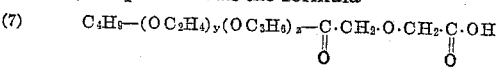

where $y$ and $z$ represent the number of oxyethylene and oxypropylene groups, respectively.

It will be observed in each of the foregoing formulae there is only one oxyalkylene chain composed of oxyethylene and oxypropylene (preferably oxy-1,2-propylene) groups.

The demulsifying compositions are preferably employed in the proportion of 1 part of reagent to from 2000 to 50,000 parts of emulsion either by adding the concentrated product direct to the emulsion or after diluting with a suitable vehicle in the customary manner.

The suitable hydrocarbon vehicle referred to in the examples is sulfur dioxide ($SO_2$) extract. This material is a byproduct from the Edeleanu process of refining petroleum in which the undesirable fractions are removed by extraction with liquid sulfur dioxide. After removal of the sulfur dioxide a mixture of hydrocarbons, substantially aromatic in character, remains which is designated in the trade as $SO_2$ extract. Examples of other suitable hydrocarbon vehicles are Gray Tower polymers, toluene, xylene, gas oil, diesel fuel, bunker fuel and coal tar solvents. The above cited examples of solvents are adaptable to azeotropic distillation as would also be any other solvent which is immiscible with water, miscible with the reacting mass and has a boiling range or boiling point in excess of the boiling point of water.

The products prepared in accordance with the invention are very useful in breaking petroleum emulsions, especially those in which the oil is paraffinic or paraffinic-naphthenic, and have been successfully used in breaking water-in-oil petroleum emulsions in the mid-continent oil fields, including Oklahoma, Illinois, Kansas, the gulf coast, Louisiana, southwest Texas and California.

This application is directed toward subject matter which was required to be divided from my copending application Serial No. 99,333, filed June 15, 1949. This application is a continuation-in-part of my copending application Serial No. 498,767, filed April 1, 1955 (now abandoned), which in turn is a continuation-in-part of Serial Nos. 98,162, filed June 9, 1949 (now abandoned), and 99,333 filed June 15, 1949 (now abandoned). The use of the compounds of the present invention in breaking water-in-oil petroleum emulsions is claimed in my copending application Serial No. 572,219, filed March 19, 1956, which is a continuation-in-part of my application Serial No. 99,333, which is a continuation-in-part of my application Serial No. 98,162.

The invention is hereby claimed as follows:

1. A monomeric acidic ester of an organic dicarboxy acid and a polyoxyalkylene compound having a terminal hydroxy group in which the major proportion of the molecular weight of said polyoxyalkylene compound consists of oxyethylene and oxypropylene groups, the weight ratio of oxyethylene to oxypropylene not exceeding 4:1, and the minimum molecular weight attributable to both oxyethylene and oxypropylene groups being at least 1000, with the further proviso that there is only one polyoxyalkylene chain composed of oxyethylene and oxypropylene groups and the major part of the molecular weight of the resultant ester is attributable to oxyethylene groups and oxypropylene groups, the molecular weight of said ester being within the range from 1500 to 7500.

2. A composition as claimed in claim 1 in which the dicarboxy acid is phthalic acid.

3. A composition as claimed in claim 1 in which the dicarboxy acid is maleic acid.

4. A composition as claimed in claim 1 in which the dicarboxy acid is diglycolic acid.

5. A monomeric acidic ester of an organic dicarboxy acid containing 2 to 8 carbon atoms and a polyoxyalkylene diol in which the oxyalkylene groups are solely oxyethylene groups and oxy-1,2-propylene groups, the molecular weight of said diol attributable to oxyethylene groups being at least 8% and not more than 75% and the molecular weight of the resultant esters being within the range from 1500 to 7500.

6. A monomeric acidic ester of an organic dicarboxy acid containing 2 to 8 carbon atoms and a monoether of a polyoxyalkylene diol in which the oxyalkylene groups are solely oxyethylene groups and oxy-1,2-propylene groups, exclusive of the terminal monoether group, the molecular weight of said diol attributable to oxyethylene groups being at least 8% and not more than 75% and the molecular weight of the resultant esters being within the range from 1500 to 7500.

7. A monomeric acidic ester of phthalic acid and a monoether of a polyoxyalkylene diol in which the oxyalkylene groups are solely oxyethylene groups and oxy-1,2-propylene groups, exclusive of the terminal monoether group, the molecular weight of said diol attributable to oxyethylene groups being at least 8% and not more than 75% and the molecular weight of the resultant esters being within the range from 1500 to 7500.

8. A monomeric acidic ester of maleic acid and a monoether of a polyoxyalkylene diol in which the oxyalkylene groups are solely oxyethylene groups and oxy-1,2-propylene groups, exclusive of the terminal monoether group, the molecular weight of said diol attributable to oxyethylene groups being at least 8% and not more than 75% and the molecular weight of the resultant esters being within the range from 1500 to 7500.

9. A monomeric acidic ester of diglycolic acid and a monoether of a polyoxyalkylene diol in which the oxyalkylene groups are solely oxyethylene groups and oxy-1,2-propylene groups, exclusive of the terminal monoether group, the molecular weight of said diol attributable to oxyethylene groups being at least 8% and not more than 75% and the molecular weight of the resultant esters being within the range from 1500 to 7500.

10. A monomeric acidic ester of diglycolic acid and a polyoxyalkylene diol in which the oxyalkylene groups are solely oxyethylene groups and oxy-1,2-propylene groups, the molecular weight of said diol attributable to oxyethylene groups being at least 8% and not more than 75% and the molecular weight of the resultant esters being within the range from 1500 to 7500.

11. A monomeric acidic ester of maleic acid and a polyoxyalkylene diol in which the oxyalkylene groups are solely oxyethylene groups and oxy-1,2-propylene groups, the molecular weight of said diol attributable to oxyethylene groups being at least 8% and not more than 75% and the molecular weight of the resultant esters being within the range from 1500 to 7500.

12. A compound having the structural formula

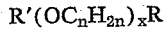

wherein R' is an acyl radical of an organic polycarboxy acid, R is a radical from the group consisting of hydroxy, oxyacyl and oxyalkyl, n is both 2 and 3 in a single molecule, x is equal to the sum of the number of times n is 2 plus the number of times n is 3, the molecular weight attributable to —$(OC_nH_{2n})_x$— being in excess of 1000, the minimum weight attributable to oxyethylene groups being at least 8%, the maximum weight ratio of oxyethylene to oxypropylene not exceeding 4:1 and the molecular weight of the compound being within the range of 1500 to 7500.

13. A compound having the following structural formula

wherein R' is an acyl radical of an organic dicarboxy acid containing 2 to 8 carbon atoms, R is an oxyacyl radical of an organic dicarboxy acid containing 2 to 8 carbon atoms, n is both 2 and 3 in a single molecule, x is equal to the sum of the number of times n is 2 plus the number of times n is 3, the molecular weight attributable to —$(OC_nH_{2n})_x$— being in excess of 1000, the minimum weight attributable to oxyethylene groups being at least 8%, the maximum weight ratio of oxyethylene to oxypropylene not exceeding 4:1 and the molecular weight of the compound being within the range of 1500 to 7500.

14. A monomeric acidic ester having the following formula

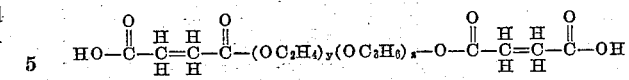

wherein y and z are sufficiently large to give the resultant ester a molecular weight within the range from 1500 to 7500, and the weight ratio of —$OC_2H_4$— to —$OC_3H_6$— does not exceed 4:1.

15. A monomeric acidic ester having the following formula

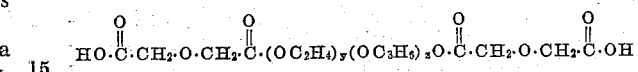

wherein y and z are sufficiently large to give the resultant ester a molecular weight within the range from 1500 to 7500, and the weight ratio of —$OC_2H_4$— to —$OC_3H_6$— does not exceed 4:1.

16. A monomeric acidic ester having the following formula

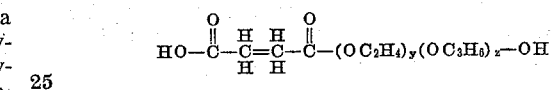

wherein y and z are sufficiently large to give the resultant ester a molecular weight within the range from 1500 to 7500, and the weight ratio of —$OC_2H_4$— to —$OC_3H_6$— does not exceed 4:1.

17. A monomeric acidic ester having the following formula

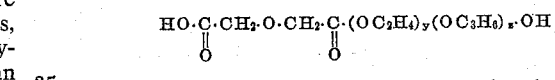

wherein y and z are sufficiently large to give the resultant ester a molecular weight within the range from 1500 to 7500, and the weight ratio of —$OC_2H_4$— to —$OC_3H_6$— does not exceed 4:1.

18. A monomeric acidic ester having the following formula

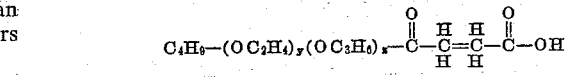

wherein y and z are sufficiently large to give the resultant ester a molecular weight within the range from 1500 to 7500, and the weight ratio of —$OC_2H_4$— to —$OC_3H_6$— does not exceed 4:1.

19. A monomeric acidic ester having the following formula

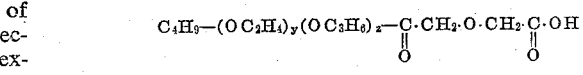

wherein y and z are sufficiently large to give the resultant ester a molecular weight within the range from 1500 to 7500, and the weight ratio of —$OC_2H_4$— to —$OC_3H_6$— does not exceed 4:1.

20. A monomeric acidic ester of diglycollic acid and a polyoxyethylene-polyoxypropylene diol, said diol being derived by the addition of approximately 4 moles to approximately 12 moles of ethylene oxide to a polyoxypropylene glycol having a molecular weight of about 2000.

21. A monomeric acidic ester of maleic acid and a polyoxyethylene-polyoxypropylene diol, said diol being derived by the addition of approximately 4 moles to approximately 12 moles of ethylene oxide to a polyoxypropylene glycol having a molecular weight of about 2000.

References Cited in the file of this patent
UNITED STATES PATENTS 2,562,878    Blair _____ Aug. 7, 1951